Nov. 23, 1954     D. FANCSALI     2,695,179
ADJUSTABLE FRAME STRUCTURE FOR CORN DETASSELERS
Filed Jan. 4, 1950     3 Sheets-Sheet 1

Inventor

Dazo Fancsali

By Clarence A. O'Brien
and Harvey B. Jacobson
Attorneys

Nov. 23, 1954  D. FANCSALI  2,695,179
ADJUSTABLE FRAME STRUCTURE FOR CORN DETASSELERS
Filed Jan. 4, 1950  3 Sheets-Sheet 2

Inventor

Dazo Fancsali

By *Clarence A. O'Brien*
*and Harvey B. Jacobson*
Attorneys

Nov. 23, 1954 D. FANCSALI 2,695,179
ADJUSTABLE FRAME STRUCTURE FOR CORN DETASSELERS
Filed Jan. 4, 1950 3 Sheets-Sheet 3

Inventor
Dazo Fancsali

By Clarence A. O'Brien
and Harvey B. Jacobson
Attorneys

United States Patent Office 2,695,179
Patented Nov. 23, 1954

2,695,179

ADJUSTABLE FRAME STRUCTURE FOR CORN DETASSELERS

Dazo Fancsali, Elburn, Ill., assignor to Steve Fancsali, Aurora, Ill.

Application January 4, 1950, Serial No. 136,740

7 Claims. (Cl. 280—32.5)

This invention comprises novel and useful improvements in a combination corn detasseler and sprayer rig and more specifically pertains to an agricultural implement which is readily adjustable to serve a variety of agricultural purposes.

The principal object of this invention is to provide an improved agricultural implement which shall be readily adjustable to accommodate itself to different widths of rows, which shall be of light-weight and inexpensive construction, and which shall be particularly adapted to such agricultural usages as a detasseling, spraying, harvesting and burning of corn and the like.

An important object of the invention is to provide an agricultural implement as set forth in the preceding paragraphs in which an improved steering and driving means is provided.

Yet another object of the invention is to provide an improved argricultural implement according to the preceding objects which shall have an improved lateral adjustability to readily adapt the device to various widths of rows, together with an improved and vertically and laterally adjustable basket supporting platforms.

These, together with various ancillary features and objects of the invention which will later become apparent as the following description proceeds, are attained by the present invention, a preferred embodiment of which has been illustrated by way of example only in the accompanying drawings, wherein.

Figure 1:
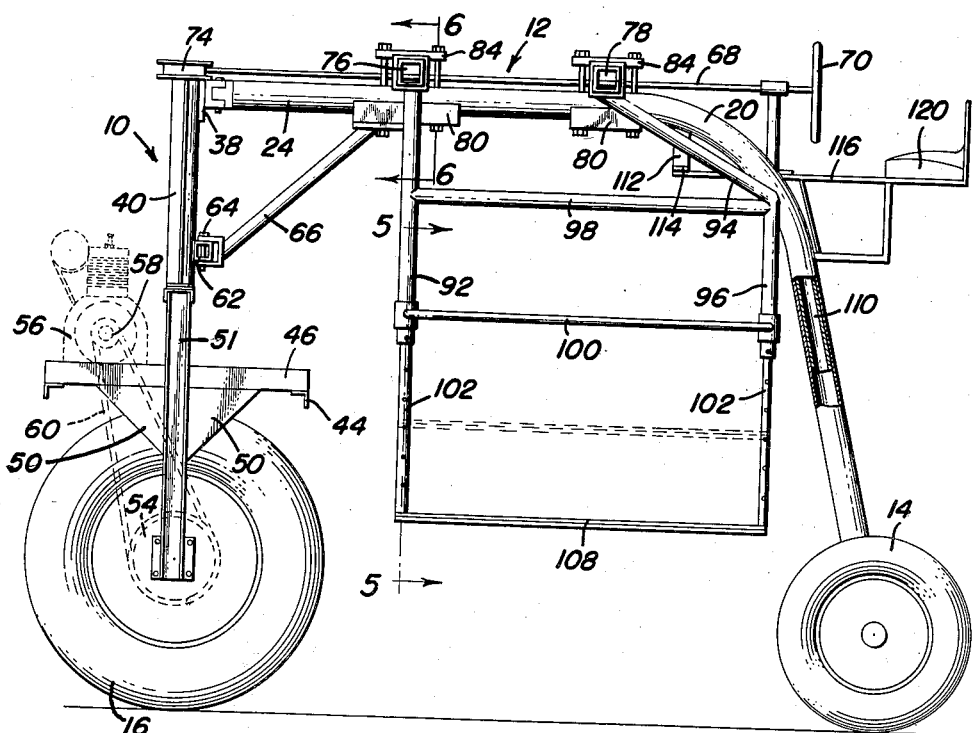
Figure 1 is a side elevational view of a preferred embodiment of the invention.
Figure 5:
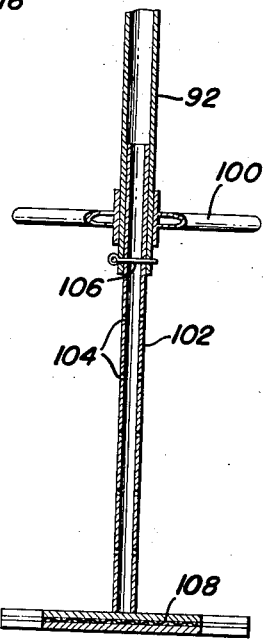
Figure 5 is a vertical transverse sectional view taken substantially upon the plane of the section line 5—5 of Figure 1 through the platform supporting framework of the invention; and, Figure 6 is a fragmentary vertical transverse sectional view taken substantially upon the plane of the section line 6—6 of Figure 1 and showing the construction of one of the frame member clamping means.

Referring now more specifically to the accompanying drawings, wherein like numerals designate similar parts throughout the various views, it will be seen that the principles of the invention have been embodied in a portable and adjustable agricultural implement which includes a front steering post assembly indicated generally by the numeral 10, and an implement framework indicated generally by the numeral 12, the latter having suitable castor wheels or the like 14 to support the rear end of the device in laterally spaced position, while the front end or the steering post assembly is provided with a combined steering and driving wheel indicated by the numeral 16, thus providing a tricycle type of wheeled implement.

The framework of the implement includes a pair of substantially L-shaped tubular frame members 18 and 20 having horizontally disposed forward portions 22 and 24 which are integrally or rigidly provided with and connected to substantially vertical, rearwardly and downwardly extending end portions 26 and 28, which at their lower ends are provided with the above mentioned castor wheels 14.

At their front ends, the longitudinally extending frame members 18 and 20 are pivotally connected as by vertically disposed pins or pivots 30 and 32, to suitable bifurcated and rearwardly extending lugs 34 and 36 which are terminally carried by a transversely or laterally disposed bracket 38 which is rigidly attached to the upper extremity of a tubular housing 40 which forms a part of the steering post assembly 10.

Suitably journaled in the housing 40, is a vertical rod or shaft 42 forming the upper end of a steering fork assembly, this shaft being connected to a suitable motor platform comprising perpendicular and horizontally disposed angle iron members 44 and 46 suitably secured to each other. The angle member 44 also has secured thereto a pair of vertically disposed substantially triangular side members 48 and 50.

The motor platform is braced by an inverted U-shaped fork member 51 rigidly secured to the shaft 42 adjacent the lower end of the housing 40. The brace member 51 has depending legs which are secured to the triangular shaped side members 48 and 50 and project therebelow. The legs form the bifurcated lower ends of the steering fork assembly between which there is journaled upon a transverse axle 52 the above mentioned steering and driving wheel 16, the latter being provided with a driving sprocket 54. A power plant of any desired type, and indicated at 56 and which may conveniently comprise a gasoline motor or the like, may be connected as by a driving sprocket 58, and sprocket chain 60, with the above mentioned sprocket wheel 54 upon the steering and driving wheel axle 52.

It will now be seen that the steering fork assembly may be rotated within the steering post 40 to thus steer the device, and as the power plant is carried by the steering fork assembly, and is rotatable therewith, the driving engagement of the power plant with the driving or steering wheel will not be interrupted during the steering operation.

In order to further brace the steering post assembly at its engagement with the longitudinally extending frame members, the housing 40 is provided with a laterally extending channel member or transverse bracket 62 to the ends of which are attached as by vertical pivot pins 64, the bifurcated extremities of brace rods 66, whose upper ends are appropriately connected to the above mentioned frame members 18 and 20 so that these members will be braced with respect to the steering post assembly and yet will be laterally pivoted thereon. By this means, the frame members may be moved from the full line position shown in Figure 2 to the dotted line position therein, thus permitting radial lateral adjustment of the frame members and their supporting castor wheels to vary the width of the latter to accommodate the implement to various widths of rows.

A suitable means for steering the device may comprise a steering shaft 68 which is disposed horizontally and extends rearwardly between the frame members, being provided with a steering wheel 70 at its rearward end, and at its front end being provided with a suitable beveled gear or the like, not shown, which is adapted to mesh with a corresponding bevel gear 72 fixed to the upper end of the steering fork shaft 42, whereby upon rotation of the steering wheel, the steering fork will be rotated within the steering post for steering the device. A suitable enclosing casing 74 may be mounted upon the bracket 38 to house the steering gears.

A pair of transverse support beams 76 and 78 are disposed in parallel relation and rest upon the upper surface of the frame members 18 and 20, and constitute a means for supporting a plurality of platforms or trays which may contain baskets, spraying apparatus or the like.

Figure 3:
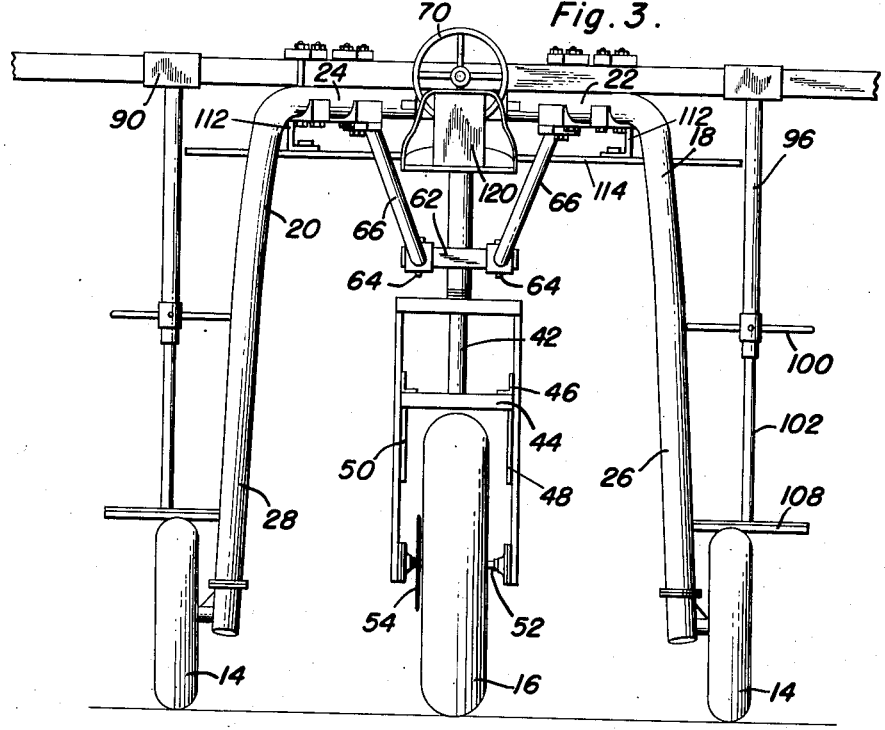
Figure 3 is a rear elevational view of the embodiment of Figure 1, the power plant being removed therefrom.
Figure 6:
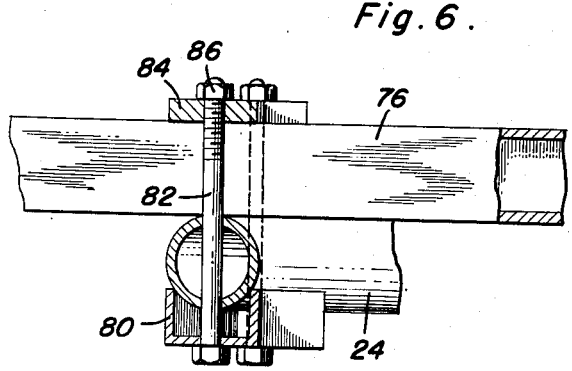

As shown particularly in Figures 3 and 6, the transverse support beams 76 and 78 may be of any suitable tubular construction, and may conveniently be of a box girder or square cross sectional type. A pair of channel members 80 are provided on each of the frame members 18 and 20 to constitute the bottom members of clamps, and fastening bolts 82 are provided extending through the lower channel members 80, the frame members 18 and 20, and upwardly above the support beams 76 and 78, for the reception of clips 84 which by means of the fastening nuts 86 are clamped together upon the frame members and the support beams. Thus, the latter are frictionally held and clamped to the frame members 18 and 20 in a manner which will permit the lateral adjustment of the latter as desired.

A depending platform supporting framework is secured to the extremities and adjustable laterally of the support beams adjacent the ends thereof. For this purpose, the end portions of each of the support beams is provided with a slidable sleeve, these being indicated at 88 for the beam 76 and at 90 for the beam 78. Vertically depending tubular members 92 depend from the sleeves 88, while angulated tubular members having rearwardly and downwardly inclined portions 94 and vertical portions 96, depend from the sleeves 90. Intermediate their ends, the tubular members 92 and 96 are connected by a rigid brace member 98, while at their lower ends they are provided with brace rods 100, thus providing a rigid framework.

Telescopingly received from the lower open ends of the tubular members 92 and 96, are slidable tubular members 102, which are provided with a plurality of vertically spaced apertures 104 which through the agency of a fastening pin 106, are selectively locked in vertically adjusted position to the end of the members 92 and 96. At their lower ends, the tubular members 102 are provided with a suitable supporting platform indicated at 108 of any desired character. The platforms 108 serve to support baskets or the like, and similarly, the member 100 likewise constitutes a supporting shelf or platform for a similar purpose.

As will now be readily apparent, the platform 108 may be readily raised or lowered as from the full line position shown in Figure 1 to the dotted line position shown therein, in order to accommodate the vertical position of this platform as desired.

It may be here noted that in order to reinforce and render more rigid the construction of the tubular frame members 18 and 20, the latter as shown in Figure 1 may be provided with tubular inserts 110 which constitute internal stiffening or strengthening means.

Figure 2:
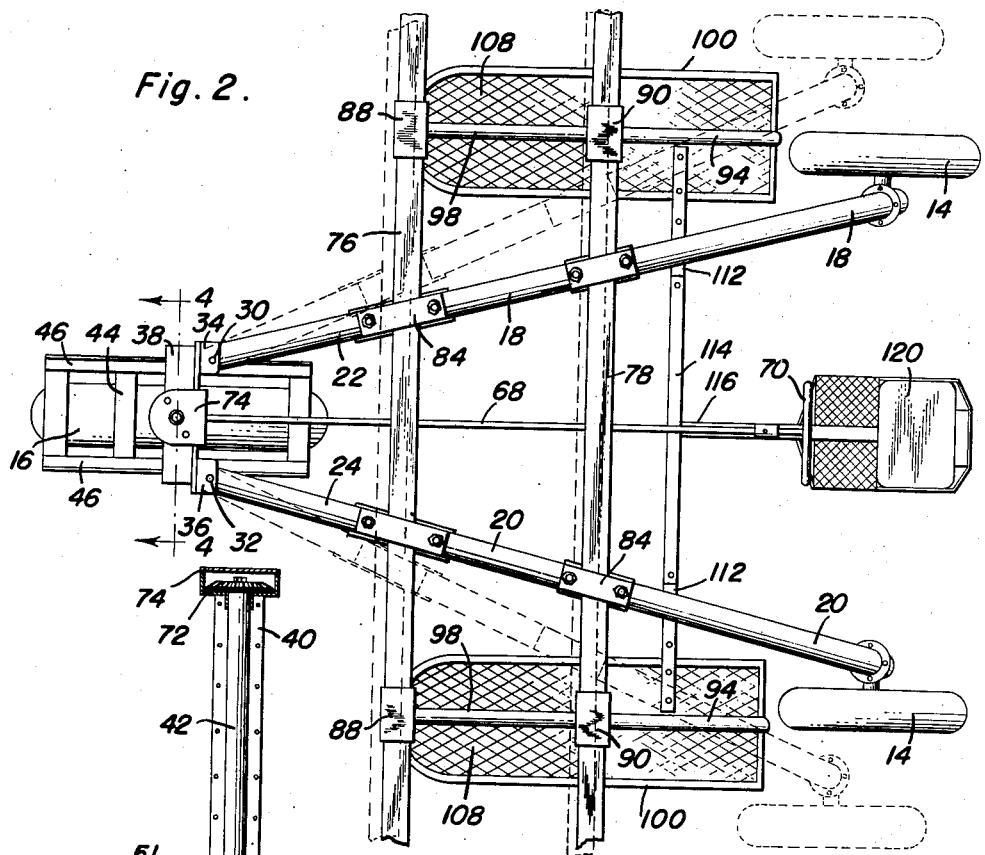
Figure 2 is a top plan view of the arrangement shown in Figure 1, the power plant being removed therefrom, and alternative positions of adjustment being indicated therein in dotted lines.
Figure 4:
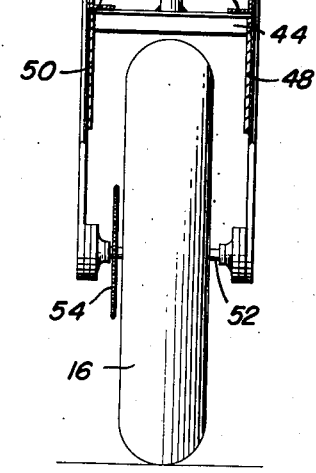
Figure 4 is a vertical transverse sectional view taken substantially upon the plane of the section line 4—4 of Figure 2 through the steering post construction of the invention.

Depending from and rigidly carried by the frame members 18 and 20, as shown in Figures 1 and 3, are vertical support members 112 which at their lower ends adjustably support a transverse frame member 114. From the mid point of the latter, as shown in Figures 1 and 2, extends a rearwardly disposed horizontal frame member 116 upon which is mounted a suitable seat 120 for the operator of the device.

From the foregoing, the construction and operation of the invention will be readily understood and further explanation is believed to be unnecessary.

However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. An agricultural implement comprising a steering wheel post, a pair of longitudinal, rearwardly extending frame members pivoted to said post for lateral swinging movement, castor wheels supporting said frame members, brace members secured to each of said frame members and pivotally connected to said post, support beams mounted upon and extending transversely of said frame members, platforms depending from said support beams outwardly from said frame members, a framework supported by the support beams on each side of said pair of frame members, sleeves slidably securing each framework to said support beams for lateral adjustment, said platforms being carried by said frameworks.

2. An agricultural implement comprising a steering wheel post, a pair of longitudinal, rearwardly extending frame members pivoted to said post for lateral swinging movement, castor wheels supporting said frame members, brace members secured to each of said frame members and pivotally connected to said post, support beams mounted upon and extending transversely of said frame members, platforms depending from said support beams outwardly from said frame members, a framework supported by the support beams on each side of said pair of frame members, sleeves slidably securing each framework to said support beams for lateral adjustment, said frameworks having depending tubular members, telescoping extensions slidable in said tubular members, said platforms being carried by said extensions.

3. An agricultural implement comprising a steering wheel post, a pair of longitudinal, rearwardly extending frame members pivoted to said post for adjustable lateral swinging movement, support beams mounted upon and extending transversely of said frame members, clamping means slidably adjustably secured to said support beams and to said frame members for securing the latter in laterally adjusted position, a framework, means for supporting said framework upon said support beams.

4. An agricultural implement comprising a steering wheel post, a pair of longitudinal, rearwardly extending frame members pivoted to said post for adjustable lateral swinging movement, support beams mounted upon and extending transversely of said frame members, clamping means slidably adjustably secured to said support beams and to said frame members for securing the latter in laterally adjusted position, a framework, means for mounting said framework upon said support beams for support by said frame members.

5. An agricultural implement comprising a steering wheel post, a pair of longitudinal, rearwardly extending frame members pivoted to said post for adjustable lateral swinging movement, support beams mounted upon and extending transversely of said frame members, clamping means slidably adjustably secured to said support beams and to said frame members for securing the latter in laterally adjusted position, frameworks, means for supporting said frameworks upon said support beams upon opposite sides of said pair of frame members.

6. An agricultural implement comprising a steering wheel post, a pair of longitudinal, rearwardly extending frame members pivoted to said post for adjustable lateral swinging movement, support beams mounted upon and extending transversely of said frame members, clamping means slidably adjustably secured to said support beams and to said frame members for securing the latter in laterally adjusted position, a framework, means for mounting said framework upon said support beams for support by said frame members, said last means including sleeves slidably securing said framework to the support beam for lateral adjustment thereon.

7. An agricultural implement, comprising a steering wheel post, a pair of longitudinal, rearwardly extending frame members pivoted to said post for adjustable lateral swinging movement, support beams mounted upon and extending transversely of said frame members, clamping means slidably adjustably secured to said support beams and to said frame members for securing the latter in laterally adjusted position, a framework, means for mounting said framework upon said support beams for support by said frame members, braces terminally and swivelly connected to said post and rigidly secured to said frame members.

References Cited in the file of this patent

UNITED STATES PATENTS

| Number | Name | Date |
|---|---|---|
| 1,210,056 | Fairman | Dec. 26, 1916 |
| 1,370,347 | Nelson | Mar. 1, 1921 |
| 2,457,821 | Johnson | Jan. 4, 1949 |
| 2,504,403 | Finley | Apr. 18, 1950 |
| 2,508,605 | Hagie et al. | May 23, 1950 |